United States Patent [19]

Rothwarf

[11] 4,373,977

[45] Feb. 15, 1983

[54] METHOD OF MAKING A COMPOSITE WIRE

[75] Inventor: Frederick Rothwarf, London, England

[73] Assignee: The United States of America as represented by the Secretary of the Army, Washington, D.C.

[21] Appl. No.: 277,365

[22] Filed: Jun. 25, 1981

[51] Int. Cl.³ .................. H01B 13/22; H01B 7/28
[52] U.S. Cl. .................................. 156/51; 29/828; 174/126 CP; 228/156; 264/105; 264/174; 427/118; 427/120; 427/124; 428/367
[58] Field of Search .............. 29/592 R, 825, 828, 29/DIG. 45, DIG. 47; 156/47, 51, 56; 174/126 C, 126 CP; 228/156; 264/105, 174; 427/118, 120, 124; 428/364, 367

[56] References Cited

U.S. PATENT DOCUMENTS

| | | | |
|---|---|---|---|
| 3,161,540 | 12/1964 | Kingsley et al. | 427/118 X |
| 3,309,326 | 3/1967 | Riley | 264/105 X |
| 3,668,748 | 6/1972 | Divecha et al. | 29/419 |
| 3,669,623 | 10/1972 | Kreider | 29/419 X |
| 3,718,569 | 2/1973 | Petersen et al. | 427/118 X |
| 3,922,769 | 12/1975 | Brenan | 29/420 X |
| 3,925,882 | 12/1975 | Sambrook | 29/599 |
| 4,126,489 | 11/1978 | Williams | 427/118 X |
| 4,213,802 | 7/1980 | Rothwarf et al. | 148/101 |

FOREIGN PATENT DOCUMENTS

| | | | |
|---|---|---|---|
| 888133 | 12/1971 | Canada | 427/118 |
| 49-26827 | 7/1974 | Japan | 427/118 |

*Primary Examiner*—Edward C. Kimlin
*Assistant Examiner*—Robert A. Dawson
*Attorney, Agent, or Firm*—Nathan Edelberg; Jeremiah G. Murray; Roy E. Gordon

[57] ABSTRACT

A high strength, lightweight composite wire is made by intercalating graphite fiber with a material that will impart high electrical conductivities to the fiber. The intercalated fiber is coated with a wetting agent and the coated intercalated graphite fiber then placed in a molten bath of magnesium or a low melting magnesium alloy. A composite wire is then produced by extrusion through a suitable die.

7 Claims, No Drawings

METHOD OF MAKING A COMPOSITE WIRE

The invention described herein may be manufactured, used, and licensed by or for the Government for governmental purposes without the payment to me of any royalty thereon.

This invention relates in general to a method of making a composite wire and in particular to a method of making a lightweight, high strength, low cost composite conducting wire or cable for military and civilian communication and/or electrical applications.

BACKGROUND OF THE INVENTION

The recent development of intercalated graphite fibers having electrical conductivities comparable to or greater than copper or silver has given rise to speculation that such lightweight, low cost materials may be able to supplant the heavier, more expensive copper for certain applications. One such application involves the development of lightweight high strength, co-axial cable for the transmission of r.f. power.

In a co-axial cable, because of the skin depth limitations of the conductor at radio frequencies, the size of the inner conductor is limiting. By use of material more highly conducting than copper for the central conductor one can transmit larger power with the same geometry. In addition the intercalated graphite is somewhat lighter and stronger than copper so that considering both lesser weight and smaller losses, this material has an approximate 4 to 1 advantage over copper conductors. To date, the ability to convert graphite into a highly conducting material has been demonstrated. In the method for making wires, graphite powder is intercalated with antimony pentafluoride, a strong Lewis acid, and packed into a copper ampoule 6 mm in diameter and sealed. The ampoule is swaged or drawn into a wire one millimeter in diameter. The result is a composite wire having a sheath of copper and a core of oriented antimony pentafluoride graphite. Measurements indicate that the core has an electrical resistivity at room temperature of $1 \times 10^{-6}$ $\Omega$-cm which compares very favorably with the resistivity of pure copper which is $1.7 \times 10^{-6}$ $\Omega$-cm. While the above method produces a wire of intercalated graphite, its tensile strength is relatively poor because the thin copper sheath has little strength and the compacted fine graphite grains constituting the core cannot support any tensile stress. Furthermore, the thin copper sheath is not in sufficiently intimate contact with the grains of the core to allow heat to be dissipated effectively. This is because these grains are aligned with their conducting planes parallel to the wire axis and since graphite has a large anisotropy in both its electrical and thermal conductivities, heat flow transverse to the planes will be inhibited. For example, the electrical resistivity measured parallel to the hexagonal conducting layer planes is lower than that measured normal thereto by a factor of about $10^6$. The same is true of the thermal conductivity. In fabricating the copper-clad composite wire with the intercalated graphite core, it is necessary that the high conductivity directions of the grains be aligned with the wire axis, and fortunately this happens naturally in the wire forming process. But unfortunately, because of the high anisotropy, a large impedance to heat transfer between grains will develop in the radial direction. Thus, the thin copper outer layer is not effective in dissipating $I^2R$ heat developed in such wires.

SUMMARY OF THE INVENTION

The general object of this invention is to provide a method of making a high strength, lightweight composite wire for military and civilian communication and or electrical applications. A further object of the invention is to provide such a method that overcomes the disadvantages of the copper clad composite; namely, lack of tensile strength and inadequate heat transfer in a radial direction.

It has now been found that the foregoing objects can be obtained by imbedding intercalated graphite in a magnesium matrix. More particularly, the method of the invention involves intercalating graphite fiber manufactured in continuous fibers many kilometers in length with a solution of a material that will impart high electrical conductivities to the fiber selected from the group consisting of strong acid fluorides, metal chlorides, metal bromides, and metal fluorides, coating the intercalated fiber with a wetting agent, placing the coated intercalated graphite fiber into a molten bath of magnesium or a low melting magnesium alloy and producing a composite wire by extrusion through a suitable die.

Graphite fibers can be manufactured in continuous fibers many kilometers in lengths. Such fibers are commercially available under the trade names Celion, Modmore, Grafoil or Thornel. These fibers are produced by various techniques but basically consist of a polyacrylonitrile precursor which has been graphitized at very high temperatures. The graphite fibers are then in the form of tows or yarns of many fibers each and some of these have a twist. The c-axis of the graphite unit cell is usually aligned perpendicular to the axis of the fiber. This effect makes the fibers suitable for intercalations so as to produce a composite fiber having high conductivity along its axis. The fibers can be intercalated by a large number of materials to give high electrical conductivities, especially the strong acid fluorides antimony pentafluoride and arsenic pentafluoride, as well as the metal chlorides such as copper chloride, the metal bromides and the metal fluorides using a range of techniques. Many of resulting intercalated graphites show the high electrical conductivity discussed above. In addition such fibers have elastic moduli as high as $75 \times 10^6$ psi and tensile strengths of about 500,000 psi.

DESCRIPTION OF THE PREFERRED EMBODIMENT

Graphite fiber manufactured in continuous fibers many kilometers in length is intercalated with copper chloride by immersion in copper chloride solution. The intercalated fiber is then coated by vacuum evaporation with a suitable wetting agent such as titanium. The titanium coated intercalated graphite fiber is then introduced into a molten bath of the alloy $Mg_{0.56}Al_{0.34}Zn_{0.1}$ that melts below 400° C. A composite magnesium/intercalated graphite wire is then produced by extrusion through a suitable die. The composite wire is then coated with silicon nitride by chemical vapor deposition to provide an hermetic seal that prevents moisture and other corrosive substances from attacking the magnesium alloy in the wire.

In the method of the invention, it is necessary to employ an intercalate that will not decompose or dissociate at the melting temperature of the magnesium or magnesium alloy. Therefore, lower melting temperature magnesium alloys must be used to attain a practical composite. Examples of such low melting temperature alloys are the copper or zinc substituted $Mg_{17}Al_{12}$ alloys. There are many possible combinations of magnesium alloys and intercalates that may be employed to make the high strength lightweight composite wires.

I wish it to be understood that I do not desire to be limited to the exact details as described for obvious modifications will occur to a person skilled in the art.

What is claimed is:

1. Method of making a high strength, lightweight composite wire, said method including the steps of:
   (A). intercalating graphite fiber manufactured in continuous fibers many kilometers in length with a solution of a material that will impart high electrical conductivities to the fiber selected from the group consisting of strong acid fluorides, metal chlorides, metal bromides, and metal fluorides,
   (B) coating the intercalated fiber with titanium as a wetting agent by means of vacuum evaporation,
   (C) placing the coated intercalated graphite fiber into a molten bath of a material selected from the group consisting of magnesium, copper substituted $Mg_{17}Al_{12}$ alloy and zinc substituted $Mg_{17}Al_{12}$ alloy, and,
   (D) producing a composite wire by extrusion through a suitable die.

2. Method according to claim 1 wherein the intercalating material is antimony pentafluoride.

3. Method according to claim 1 wherein the intercalating material is copper chloride.

4. Method according to claim 1 wherein the intercalating material is arsenic pentafluoride.

5. Method according to claim 1 wherein the zinc substituted $Mg_{17}Al_{12}$ alloy is $Mg_{0.56}Al_{0.34}Zn_{0.1}$.

6. Method according to claim 1 wherein the composite wire is coated with silicon nitride by chemical vapor deposition to seal it from moisture and other corrosive substances.

7. Method of making a high strength, lightweight composite wire, said method consisting of intercalating graphite fiber manufactured in continuous fibers many kilometers in length with a solution of copper chloride, coating the intercalated fiber by vacuum evaporation with titanium, placing the coated, intercalated fiber into a molten bath of the low melting magnesium alloy $Mg_{0.56}Al_{0.34}Zn_{0.1}$, producing a composite wire with silicon nitride by chemical vapor deposition to seal it from moisture and other corrosive substances.

* * * * *